United States Patent [19]

Saeki et al.

[11] Patent Number: 4,959,277

[45] Date of Patent: Sep. 25, 1990

[54] PROCESS FOR TREATING PLATED STEEL SHEET

[75] Inventors: Kenshi Saeki, Kurashiki; Takao Ogino, Hiratuka; Noriaki Yoshitake, Hiratsuka; Takumi Honda, Hiratsaka; Akira Nishihara, Yokohama; Hiroshi Okita, Yokosuka; Yukio Tsuge, Ebina; Haruo Iizuka, Atugi, all of Japan

[73] Assignees: Nihon Parkerizing Co., Ltd.; Mitsubishi Kasei Corporation, both of Tokyo, Japan

[21] Appl. No.: 444,664

[22] Filed: Dec. 1, 1989

[30] Foreign Application Priority Data

Dec. 7, 1988 [JP] Japan .................. 63-309774

[51] Int. Cl.$^5$ .................. B32B 15/04; B32B 15/08; C25D 13/06; C25D 13/20
[52] U.S. Cl. .................. 428/623; 428/622; 428/626; 428/624; 428/632; 428/659; 428/684; 204/181.1; 204/181.4; 204/181.7
[58] Field of Search .............. 204/181.1, 181.3, 181.4, 204/181.7; 427/409, 410; 428/622, 623, 624, 626, 632, 659, 684

[56] References Cited

U.S. PATENT DOCUMENTS 4,775,600 10/1988 Adaniya .................. 428/623
4,876,160 10/1989 Shindou .................. 427/410
4,889,775 12/1989 Adaniya .................. 428/623

FOREIGN PATENT DOCUMENTS 58-174582 10/1983 Japan .
60-13078 1/1985 Japan .
62-73938 4/1987 Japan .
62-225341 10/1987 Japan .
62-289274 12/1987 Japan .

Primary Examiner—John F. Niebling
Assistant Examiner—Ben C. Hsing
Attorney, Agent, or Firm—Ladas & Parry

[57] ABSTRACT

The present invention relates to a process for surface treatment for cathodic electrodeposit coating of a zinc-plated or zinc alloy-plated steel sheet comprising coating and drying a protective coating material on said steel sheet chromate-treated beforehand, to form a protective film before subjecting the sheet to the cathodic electrodeposit coating, which comprises coating a protective coating material having as a principal constituent of film-forming organic component a block isocyanate-containing prepolymer containing in one and the same molecule respectively at least one blocked isocyanate group, hydroxyl group, and tertiary amono group and containing 10–100 parts by weight of silica sol relative to 100 parts by weight of said prepolymer, in an amount of 0.3 g–4 g/m$^2$, and then heat-drying the same.

13 Claims, No Drawings

PROCESS FOR TREATING PLATED STEEL SHEET

BACKGROUND OF THE INVENTION

The present invention relates to a rust preventive steel sheet excellent in rust prevention, workability, and electrodeposit coatability mainly intended for use in automobile car bodies, electric appliance boxes, furniture, building external walls, and the like.

In recent years, the target quality required for rust prevention of automobiles is becoming increasingly higher year after year. As regards the corrosion restricted service life, the Canadian Code specifies 1.5 years for cosmetic corrosion and 5 years for perforation corrosion. In the U.S.A., development is being forwarded aiming at 5 years for cosmetic corrosion and 10 years for perforation corrosion. To meet such requirements, so-called Zincrometal ® and organic composite plated steel sheets are in use as the surface-treated steel sheet for automobiles.

The zincrometal sheet is based on the technology developed by Diamond Shamrock Co. (U.S.A.) and is prepared by coating a zinc-rich primer Zincromet ® on a steel sheet treated with Dacromet ®, an aqueous solution of a mixture of chromic acid anhydride, metallic zinc particles, reducing catalyst, thickener, etc. Although the sheet has good corrosion resistance and electrodeposit coatability, since it is coated considerably thick (10-15 $\mu$m) with a primer of high metallic zinc content, it has been pointed out that it is expensive, liable to cause peeling of coating film during forming operation and to give rise to decreased spot welding strength caused by combustion residue formed during welding.

Various organic composite plated steel sheets have been proposed to ameliorate the above-mentioned problems. Thus, zinc-plated or zinc alloy-plated steel sheets are, after subjected (or directly without being subjected) to a chemical conversion treatment such as chromate treatment, coated with a protective film comprising mainly organic substances. In such cases, since increasing the thickness of plating layer leads to such problems as cracking and peeling in forming operations, the measures taken for enhancing the corrosion resistance have been predominantly through the improvement of protective film, and various proposals have been made regarding the composition of the film.

The vehicle resin of protective film commonly used is acrylic resin or epoxy resin. It is known that, generally speaking, acrylic resin is unsatisfactory in solvent resistance, alkali resistance, and adhesion and epoxy resin is unsatisfactory in subsequent workability with respect to its ductility. With the aim of obtaining a better balance of these properties, proposals have been made to use polyurethane type resins as the material for vehicle.

For example, there may be mentioned Japanese Patent Application Kokai (Laid-open) Nos. 56-84,759, 56-89,548, 57-30,717, 58-40,372, 58-52,370, 58-174,582, 60-13,078, 62-73,938, 62-225,341 and 62-289,274. Among them, Japanese Patent Application Kokai Nos. 56-84,759, 56-89,548, 57-30,717, 58-40,372, 58-52,370 and 58-174,582 relate to coating materials prepared from polymers or oligomers containing an active hydrogen-bearing group such as the hydroxyl, carboxyl, and amino group and block isocyanate as starting materials.

Thus, Japanese Patent Application Kokai No. 56-84,759 relates to a "coating composition comprising (a) an oil-free alkyd resin having an acid value of 50 KOH mg/g or less and a hydroxyl value of 50-250 KOH mg/g which has been reacted with 1-15% by weight of a polyphenol-carboxylic acid and (b) a block isocyanate compound.

Japanese Patent Application Kokai No. 56-89,548 [Japanese Patent Publication (Kokoku) No. 62-49,116] relates to "a precoated metal obtained by coating on a metal sheet, followed by heat-curing, a composition comprising bis(isocyanatomethyl)cyclohexane blocked with an oxime-type or lactam-type blocking agent, or an adduct thereof, and a polyol resin". Examples of the substrate metal given therein include phosphate-treated galvanized sheet iron, etc.

Japanese Patent Application Kokai No. 57-30,717 relates to "a process for producing a thermosetting resin which uses a reaction product of an epoxy resin mainly of the bisphenol type, a dicarboxylic acid and a secondary amine having at least one primary hydroxyalkyl group, and a block isocyanate". It exemplifies the use of a coating material comprising said thermosetting resin as the vehicle, as a primer for zinc phosphate-treated galvanized sheet iron.

Japanese Patent Application Kokai No. 58-40,372 relates to "a coating composition for chromate-treated zinc-plated steel sheets comprising an oil-free alkyd resin having an acid value of 50 or less and a hydroxyl value of 50-250 which has been reacted with tannic acid, and a block isocyanate compound."

Japanese Patent Application Kokai No. 58-52,370 relates to "an aqueous coating composition for chromate-treated zinc-plated steel sheets comprising the organic amine salt or ammonium salt of an oil-free alkyd resin having an acid value of 20-100 and a hydroxyl value of 50-250 which has been reacted with tannic acid, and a water dispersible or water-soluble block isocyanate compound."

Japanese Patent Application Kokai No. 58-174,582 relates to a weldable coated steel sheet obtained by applying to a zinc-plated steel sheet, followed by drying, a composition comprising chromic acid anhydride, a water-soluble acrylic resin and/or water-dispersible acrylic resin, an organic reducing agent and water as under coating and then applying thereonto, followed by baking and drying, a top coating composition comprising an oil-free polyester resin containing as the dibasic acid 30-70% by mole of terephthalic acid relative to the total organic acid content, a melamine resin and/or block isocyanate as the curing agent, zinc dust and solvent, in a dry film thickness of 3-20 $\mu$m."

Japanese Patent Application Kokai Nos. 56-84,759, 58-40,372 and 58-52,370 employ, as the polyol component to be reacted with isocyanate, an oil-free alkyd resin containing a specified acid value, namely a specified amount of carboxyl groups, which has been reacted with a polyphenol-carboxylic acid or tannic acid. Although film thickness is not particularly specified in these inventions, coated articles of 25±3 m film thickness are used in the comparison of the film properties between the compositions of said inventions and those mentioned as comparative examples, to show the more excellent corrosion resistance given by the compositions of the inventions.

However, in the case of rust preventive steel sheets for cathodic electrodeposit coating intended for in the present invention, thick coating of nonionic or anionic resin gives rise to poor electrodeposit coatability even when the resin shows good adhesion and high hardness and good corrosion resistance is exhibited by thick coating. That is, crater-formed defects are apt to develop in the electrodeposit coated film.

Japanese Patent Application Kokai No. 56-89,548 is characterized by using as block isocyanate a blocked bis(isocyanatemethyl)cyclohexane or its adduct. The isocyanate, however, is more expensive and less reactive than aromatic isocyanates. The polyols used therein are all, except for one example of nonionic acrylic type, anionic polyester polyol. No mention is made of cationic ones.

Japanese Patent Application Kokai No. 58-174,582 uses as the polyol an oil-free polyester of a specific composition. Though it makes no mention of the acid value of polyester, the polyester is usually an anionic polyol having a certain extent of acid value. Further, a coating film thickness of 3-20 $\mu$m is specified as a limiting condition. Also in this case, the coating is not suited for use as the primer for cathodic electrodeposit coating for reasons described above. Further, although the use of a block isocyanate as the curing agent is mentioned as the feature of said invention, only those examples wherein methylol melamine is used as the curing agent are given and no mention is made of the use of block isocyanate, in its working examples.

In Japanese Patent Application Kokai No. 57-30,717, the resin used, though its structure is not fully clear from the description of the specification, is cationic and is similar to the vehicle used in the present invention in respect of having a blocked isocyanate group. However, no mention is made therein of cathodic electrodeposition, addition of silica sol and coating film thickness. A film thickness of 8 $\mu$m is exemplified in its working example. It is thought that, as described in its specification, the resin has been developed mainly for use in so-called precoated metals of "precoat-top coat" type, which are in use as building materials and the like.

SUMMARY OF THE INVENTION

The present inventors have been investigating the primer for cathodic electrodeposit coated zinc-plated steel sheets used for automobile outside plates. In such uses, it is usual that so-called rust preventive steel sheets prepared by chromate-treating zinc-plated or zinc alloy-plated steel sheets (hereinafter referred to as plated steel sheets) and then coating a primer thereon followed by drying are manufactured by and shipped from steel manufacturers and worked up at auto makers in successive order of cutting, pressing, welding, degreasing, phosphate conversion treatment, electrodeposit coating, intermediate coating, and top coating. Accordingly, the primer for rust preventive steel sheets is required to have, besides rust preventive effect for the rust preventive steel sheet itself, high solvent resistance and heat resistance in addition to high workability, weldability and electrodeposit coatability in subsequent steps. However, there has been known no primer for rust preventive steel sheets which is satisfactory in all of these properties. That is, when the improvement of any of the above properties is attempted, it has resulted in the deterioration of some other properties. For example, when the thickness of primer film is increased, the corrosion resistance is generally improved but the subsequent workabilities (such as bendability and weldability) and electro-deposit coatability are deteriorated.

The present inventors have made extensive study to find a surface treatment process for the cathodic electrodeposit coating of zinc-plated or zinc alloy-plated steel sheets which can solve the problems of prior art described above and satisfy all the requirements for qualities of rust preventive steel sheets. As the result, it has been found that a rust preventive steel sheet which develops no defect in cathodic electrodeposit coating film and can fully satisfy all the requirements for properties, including corrosion resistance, of automobile outside plates can be produced by coating on a chromate-treated plated steel sheet a primer (i.e. protective coating material) which comprises as the principal constituent of the organic component of coating film a block isocyanate-containing prepolymer containing in one and the same molecule respectively at least one blocked isocyanate group, hydroxyl group, and tertiary amino group and containing 10-100 parts by weight of silica sol relative to 100 parts by weight of said prepolymer, in an amount of 0.3 g-4 g/m$^2$ in terms of dry weight, and then heat-drying the same.

Thus, the present invention provides a process for surface treatment for cathodic electrodeposit coating of a zinc-plated or zinc alloy-plated steel sheet comprising coating and drying a protective coating material on said plated steel sheet chromate-treated beforehand, to form a protective film before subjecting the sheet to the cathodic electrodeposit coating, which comprises coating a protective coating material having as a principal constituent of film forming organic component a block isocyanate-containing prepolymer containing in one and the same molecule respectively at least one blocked isocyanate group, hydroxyl group, and tertiary amino group and containing 10-100 parts by weight of silica sol relative to 100 parts by weight of said prepolymer, said coating material having been applied in an amount of 0.3 g-4 g/m$^2$ in terms of dry weight, and then heat-drying the same.

DETAILED DESCRIPTION OF THE INVENTION

The plated steel sheets, namely zinc-plated or zinc alloy-plated steel sheets, used in the present invention are not specifically restricted and include those prepared by electrogalvanizing, hot-dip galvanizing, and vapor deposition. Usually those having a coating weight of 10-40 g/m$^2$ are used.

The chromate treatment of the plated steel sheet may also be accomplished by known methods. Both the so-called reaction type chromate treatment and the dry-in-place type chromate treatment may be used. The chromate treatment step is indispensable to decreasing the thickness of primer layer applied afterwards. The amount of Cr in the coating is preferably 10-200 mg/m$^2$, particularly preferably 30-150 mg/m$^2$.

The essentials of the present invention lie in the primer composition used and the thickness of its coating.

As to the resin for the primer, as described above, nonionic or anionic resin is used. It has been found however that, particularly when film thickness is increased, crater-formed defects are liable to develop on the electrodeposit coating surface during cathodic electrodeposit coating, so that the use of cationic resins is preferable. Although the mechanism of development of the above defects is not yet clear, a conceivable cause is that in cathodic electrodeposit coating in which the article to be coated serves as the cathode, some pulling force toward the opposite electrode is exerted on the primer film, in a rust preventive steel sheet wherein anionic resin is used.

In cathodic electrodeposit coating, the surface of the article to be coated becomes alkaline and an electrodeposit coating material is deposited and coated thereon. Further, an electrodeposit coating material usually contains a solvent such as cellosolves added thereto. Accordingly, the surface needs to be resistant to alkali and solvent. Therefore, a mere thermoplastic resin cannot exhibit a satisfactory performance and the use of a thermosetting (crosslinking) type resin is required. On the other hand, since rust preventive steel sheets are manufactured in a large scale, the line speed of their production is high and the length of the heating furnace used for heat-drying and curing has its limit, so that the shorter the curing time of the resin used the more preferable.

Further, in respect of the relation between the concentration of a coating material and its viscosity at the time of coating, high molecular weight resins are difficultly used because of their property known as spinnability. Taking the above-mentioned points into consideration, a cure-type resin, either polyurethane using polyisocyanate and polyol oligomer or polyurea using polyisocyanate and polyamine oligomer is most suitably used.

In such a case, when polyisocyanate is mixed with polyol or polyamine, a reaction between the mixed components proceed even when an aliphatic or alicyclic isocyanate of relatively low reactivity is used, resulting in increase of the viscosity with time and ultimately in gelation of the system. It is necessary, therefore, to keep the isocyanate group inactivated during the storage of coating material and activate it in heating subsequent to coating, in other words to block the isocyanate group beforehand.

Further, in electrodeposit coating, if the coating film of the rust preventive steel sheet used is not uniform, the electrodeposition is apt to proceed partly non-uniformly, leading to non-uniform electro conductivity and development of unevenness in the electrodeposit coating film, depending on the difference in the compatibility between the pigment and the vehicle resin or, when the vehicle resin is of multi components, between its component materials. Accordingly the composition of resin is preferably microscopically uniform.

After extensive studies taking the above-mentioned points into consideration, it has been found that the most suitable material resin for the object of the present invention to be used is a block isocyanate-containing prepolymer which contains in one and the same molecule respectively at least one blocked isocyanate group, hydroxyl group, and tertiary amino group.

Various process are conceivable for preparing a prepolymer containing a blocked isocyanate group which contains in one and the same molecule respectively at least one blocked isocyanate group, hydroxyl group, and tertiary amino group. The most general is a process comprising reacting a tertiary amino group-containing polyol with a polyisocyanate compound having at least one blocked isocyanate group and at least one free isocyanate group.

As examples of the aminated polyol which may be used in the above reaction, mention may be made of trialkanolamines (e.g., triethanolamine, tripropanolamine, and tributanolamine) alkylene oxide adduct of polyalkylene polyamine (e.g., reaction product as an adduct of ethylene oxide, propylene oxide, or butylene oxide to ethylenediamine, diethylenetriamine, or hexamethylenediamine), and reaction product as an adduct of alkylene oxide and alicyclic or aromatic polyamine such as di(methylamino)cyclohexane and xylylenediamine.

Further, there may also be used a reaction product of these aminated polyols with diisocyanate compounds (e.g., the reaction product of 2 moles of triethanolamine with tolylene diisocyanate) and an adduct of epoxy resin with dialkanolamines [e.g., the adduct of 2 equivalents of an epoxy resin having an epoxy equivalent of 190 (Epicoat 828, a trade name, mfd. by Yuka-Shell Co. Ltd.) with 2 moles of diethanol-amine.]

The polyisocyanate compounds which may be used in the present invention include aromatic diisocyanate such as tolylene diisocynate, diphenylmethane diisocyanate, xylylene diisocyanate, and naphthalene diisocyanate, and alicyclic isocyanates which are the hydrogenated derivatives thereof; aliphatic or alicyclic isocyanates such as hexamethylene diisocyanate and isocphorone diisocyanate; and dimers and trimers thereof. It is needless to say that so-called prepolymers obtainable by the reaction of these polyisocyanates with polyether polyols, polyester polyols, etc. may also be used.

For obtaining a primer which is particularly excellent in workability and spot weldability, it is effective to use a prepolymer having isocyanate terminals obtainable by the reaction of a polyol with a polyisocyanate and thereby to introduce a urethane linkage into the main chain.

As examples of the polyether polyols, mention may be made of polyols obtained by the addition of ethylene oxide, propylene oxide, etc. to low molecular glycols such as ethylene glycol, propylene glycol, bisphenol A, etc., and polyoxytetramethylene glycol.

As examples of the polyester polyols, mention may be made of polyesters obtained by dehydration condensation of low molecular glycols with dibasic acids, and lactone polyols obtained by ring-opening polymerization of lactones such as $\epsilon$-caprolactone in the presence of said glycols.

The blocking agents for isocyanate which may be used include monofunctional blocking agents used in preparing conventional block isocyanates, namely alcohols, phenols, lactams, oximes, etc.

Examples of the alcohols include isopropyl alcohol, t-butyl alcohol, and cumyl alcohol.

Examples of the phenols include phenol, cresol, xylenol, alkylphenols, nitrophenols, and halogenated phenols.

Examples of lactams include $\epsilon$-caprolactam, $\delta$-valerolactam, $\gamma$-butyrolactam, and $\beta$-propiolactam.

Examples of oximes include formamidoxime, methyl ethyl ketoxime acetaldoxime, acetoxime, diacetylmonooxime, cyclohexanone-oxime, and benzophenone-oxime.

The reaction of these aminated polyols with block isocyanates will now be described with reference to a tetra-functional aminated polyol (I) [represented by $R_1-(OH)_4$] and a 1/2 block product (II) of diisocyanate [represented by $OCN-R_2-NCO \cdot HR_3$, $HR_3$ being a blocking agent] as examples. Theoretically, when 2 moles of the 1/2 block diisocyanate is used relative to 1 mole of the aminated polyol to cause 2 equivalents of hydroxyl groups in the compound (I) to react with free isocyanate groups in the compound (II), and the reaction product (III) thus obtained

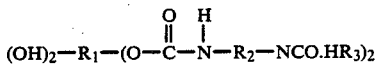

$$(OH)_2-R_1-(O-\overset{O}{\underset{\|}{C}}-\overset{H}{\underset{|}{N}}-R_2-NCO \cdot HR_3)_2$$

is afterwards coated and heat-cured as a primer, the block is detached to liberate the isocyanates, which will then react with hydroxyl groups present in an equivalent amount, resulting in formation of polyurethane resin film with effectively developed cross linkages. Thus, in reacting an aminated polyol with a partially blocked polyisocyanate it is usual to adopt such conditions that the active hydrogens, remaining after the reaction of active hydrogens in the aminated polyol with free isocyanate groups in the partially blocked isocyanate, are present in an amount equivalent to blocked isocyanate groups.

In practice, however, when the amount of unreacted hydroxyl groups is too large, the water absorbability of the resulting film becomes high and, on the other hand, the excess isocyanates will react with urethane groups formed to change into allophanates or react with moisture in the air or in other raw materials to form urea linkages. Therefore, the reaction is preferably conducted under conditions such that the hydroxyl groups and the isocyanate groups are present in equivalent amount or the isocyanate groups are somewhat in excess, rather than in the presence of excess hydroxyl groups. The molar ratio of hydroxyl groups to block isocyanate used in the present invention is preferably in the range of 3/1 to 1/3, preferably 2/1 to 1/2.

The block isocyanate-containing prepolymers described above which contain in one and the same molecule respectively at least one blocked isocyanate group, hydroxyl group, and tertiary amino group are known already, for example in Japanese Patent Publication No. 53-38,317, and Japanese Patent Application Kokai (Laid-open) Nos. 47-35,097 and 48-96,696. The prepolymers prepared based on the above patent applications may be effectively used as the resin for the present invention.

Description will now be made of silica sol, the second essential constituent of the present invention. The results of investigation conducted by the present inventors have revealed that rust preventive steel sheets for use in cathodic electrodeposit coating which have desired properties sufficiently cannot be obtained merely by coating on a chromate-treated plated steel sheet the above-mentioned coating material containing a blocked isocyanate group, hydroxyl group, and tertiary amino group, and a rust preventive steel sheets with good properties can be produced only when silica sol is added to the coating material.

The silica sol to be used herein is not limited specifically so long as it is compatible with said prepolymer containing in one and the same molecule a blocked isocyanate group, hydroxyl group, and tertiary amino group, and does not cause such troubles as coagulation. Silica sols available on the market at the present time may be used including fumed silica (Aerosil® 200, R-972, a trade name) of Nippon Aerosil Co. and nonaqueous solvent type silica sol (Colloidal Silica ETCST, a trade name) of Nissan Kagaku K.K.

The amount of silica sol used is preferably 20–80 parts by weight, relative to 100 parts of the prepolymer containing in one and the same molecule a blocked isocyanate group, hydroxyl group, and tertiary amino group. When the amount of silica sol used is 10 parts or less the corrosion resistance is unsatisfactory, whereas when it is 100 parts or more the adhesion of coating film is deteriorated.

The present primer may be incorporated, within limits not deleterious to the intended properties, with ingredients commonly added to coating materials, namely various additives including extender pigments, coloring pigments, pigment-dispering agents, sedimentation preventives, antifoaming agents, leveling agents, antioxidants, thickness, lubricants, antistatic agents, etc. Also, the solvent to be used is not restricted specifically, and various solvents commonly used is coating materials may be used to prepare a coating material of proper concentration and viscosity according to known methods.

The primary coating material thus prepared contains in the same molecule an isocyanate group, though blocked and stabilized, and a hydroxyl group and further a tertiary amino group which has a catalytic funcion for the reaction between the above two functional groups, so that it is preferably kept at low temperatures within limit that does not cause solidification and freezing, in storage.

The method used for coating the primary coating material thus obtained on a chromate-treated plated steel sheet is also not restricted specifically, and various coating methods may be used including dipping, spraying, curtain coating, roll coating, and brushing. In general, however, it is applied by roll coating onto one side or both sides and then heat-dried.

Description will now be made of the coating film thickness, and third limiting condition of the present invention. In general, the corrosion resistance increases with increasing coating film thickness and, in the case of a so-called 2-coat, 2-bake type precoated steel sheet, which is used as building materials to which electrodeposit coating is not applied, the primer is coated in a thickness of about 3–20 g/m². However, the present inventors, in carrying out the present development aiming at use for electrodeposit coating, have found that it is necessary for obtaining a good electrodeposit coated steel sheet to coat the above-described primer so that the resulting dry film is present in an amount of 0.3–4 g/m², preferably 0.4–2.5 g/m², of the surface coated. When the film is present in an amount of 0.3 g/m² or less the corrosion resistance is unsatisfactory, and when it exceeds 4 g/m² crater-formed defects develop on the electrodeposit coating film.

The steel sheet coated with the primer coating material is then heat-dried. The drying temperature is 80°–300° C., usually about 110°–250° C.

DESCRIPTION OF THE PREFERRED EMBODIMENTS

Some examples of the process for surface treatment for obtaining a rust preventive steel sheet excellent in elecrodeposit coatability and corrosion resistance according to the present invention and the methods of evaluation used therein are described below.

(1) Substrate Sheet

The substrate sheet used was a Zn-Ni alloy-plated (Ni content: 12%) steel sheet with a coating weight of 20 g/m².

(2) Chromate Pretreatment

The above substrate sheet was degreased with alkali, rinsed with water, dried, and then roll-coated with Palene #4513H (dry-in-place type chromating chemical, mfd. by Nippon Parkerizing Co.) so as to give 60 g/m² of Cr in the coating after drying (in terms of metallic chromium). The dried sheet was then coated with resin compositions described below to make comparative examination.

(3) Method of Synthesis of Starting Resin

RESIN SYNTHESIS EXAMPLE I

In a reactor fitted with a thermometer and a stirrer was placed 43.5 g of a mixture (hereinafter referred to as 80-TDI) of 80% of 2,4-tolylene diisocyanate and 20% of 2,6-tolylene diisocyanate, the inner temperature was brought to 60° C., and 50.0 g of bifunctional polypropylene glycol having an average molecular weight of 400 was added dropwise to the mixture with stirring. After completion of the addition, the resulting mixture was allowed to react for further 3 hours at 60° C. to give a prepolymer.

Then, a liquid mixture of 37.3 g of triethanolamine and 87.2 g of acetone was reacted with the above-mentioned prepolymer at 50° C. for 3 hours to obtain a tert-amino group-containing oligo-polyol solution (AOP-1).

In a separate reactor was placed 43.5 g of 80-TDI, the inner temperature was brought to 60° C., and a mixed solution of 23.5 g of phenol and 44.7 g of acetone was added dropwise thereto with stirring. After completion of the addition, the resulting mixture was allowed to react for further 2 hours to obtain a block isocyanate solution (BL-1) wherein one half of the isocyanate groups in TDI had been blocked by phenol. Suceedingly, 218.0 g of the above-mentioned tertiary amino group-containing oligo-polyol solution (AOP-1) was reacted with 111.7 g of the block isocyanate solution (BL-1) at 50° C. for 2 hours to obtain a prepolymer solution (resin I, solid content: 60% by weight) for primer which contained in one and the same molecule a block isocyanate group, tertiary amino group and hydroxyl group.

RESIN SYNTHESIS EXAMPLE II

In the same manner as for resin I, 43.5 g of 80-TDI, 75.0 g of a bifunctional polypropylene glycol having an average molecular weight of 600, and 37.5 g of triethanolamine were made to react in 103.9 g of acetone to obtain an oligo-polyol solution (AOP-2) containing tertiary amino groups. Then, 259.7 g of the oligopolyol solution (AOP-2) was reacted with 111.7 g of the same block isocyanate solution (BL-1) as that synthesized in resin I to obtain a prepolymer solution (resin II) for primery containing a block isocyanate group, tertiary amino group and hydroxyl group in one and the same molecule.

RESIN SYNTHESIS EXAMPLE III

In the same manner as for resin I, 43.5 g of 80-TDI, 50 g of polypropylene glycol having an average molecular weight of 400, and 33.5 g of trimethylol-propane were made to react in 84.7 g of acetone to obtain an oligopolyol solution (AOP-3). Then, 211.7 g of the oligopolyol solution (AOP-3) was reacted with 111.7 g of the same block isocyanate solution (BL-1) as that prepared in Resin Synthesis Example I to obtain a prepolymer solution (resin III) for primer containing a block isocyanate group and hydroxyl group in one and the same molecule.

RESIN SYNTHESIS EXAMPLE IV

To 179 g of a 60% acetone solution of an acryl polyol having an average molecular weight of 3400, acid value of 33, and hydroxyl value of 65, was added dropwise 55.8 g of the same block isocyanate solution (BL-1) as that prepared in Resin Synthesis Example I so as to keep an inner temperature of 60° C. After completion of the dropwise addition, the resulting mixture was heated at 60° C. for further 8 hours to effect reaction. Thus, a prepolymer solution (resin IV) for primer containing block isocyanate groups was obtained.

RESIN SYNTHESIS EXAMPLE V

In the same manner as for resin I, 43.5 g of 80-TDI, 72.5 g of polypropylene glycol (trade name BPX-33, mfd. by Asahi Denka Co., Ltd.) having a molecular weight of 580 obtained by adding about 6 moles of propylene oxide to bisphenol A, and 37.3 g of triethanolamine were made to react in 102.2 g of methyl ethyl ketone to obtain an oligo-polyol solution (AOP-5) containing tertiary amino groups.

In a separate reactor, 32.6 g of 80-TDI was reacted with 20.3 g of p-cresol in 35.3 g of methyl ethyl ketone to obtain a block isocyanate solution. Then, 88.2 g of the block isocyanate solution was reacted with 255.5 g of the oligo-polyol solution (AOP-5) at 50° C. for 2 hours to obtain a prepolymer solution (resin V) for primer containing a block isocyanate group, tertiary amino group, and hydroxyl group in one and the same molecule.

RESIN SYNTHESIS EXAMPLE VI

In the same manner as for resin I, 66.6 g of isophorone diisocyanate, 60.0 g of polypropylene glycol having the molecular weight of 400, and 29.8 g of triethanolamine were made to react by use of 0.08 g of dibutyl tin dilaurate, a catalyst, in 104.3 g of methyl ethyl ketone to obtain an oligo-polyol solution (AOP-6) containing tertiary amino groups.

In a separate reactor, 33.3 g of isophorone diisocyanate was reacted with 14.1 g of phenol by use of 0.05 g of dibutyl tin dilaurate, a catalyst, in 31.6 g of methyl ethyl ketone to obtain a block isocyanate solution. Then, 79 g of the block isocyanate solution was reacted with 260.7 g of the oligo-polyol solution (AOP-6) at 60° C. for 3 hours to obtain a prepolymer solution (resin VI) for primer containing a block isocyanate group, tertiary amino group, and hydroxyl group in one and the same molecule.

RESIN SYNTHESIS EXAMPLE VII

In the same manner as for resin I, 62.5 g of diphenylmethane diisosyanate, 72.5 g of BPX-33, and 47.8 g of triisopropanolamine were made to react in 121.9 g of methyl ethyl ketone to obtan an oligo-polyol solution (AOP-7) containing tertiary amino groups.

In a separate reactor, 62.5 g of diphenylmethane diisocyanate was reacted with 21.8 g of methyl ethyl ketoxime in 56.2 g of methyl ethyl ketone to obtain a block isocyanate solution. Then, 304.7 g of the block isocyanate solution was reacted with 140.5 g of the oligo-polyol solution (AOP-7) to obtain a prepolymer solution (resin VII) for primer containing a block isocyanate group, tertiary amino group, and hydroxyl group in one and the same molecule.

RESIN SYNTHESIS EXAMPLE VIII

To a mixed solution of 47.5 g of an epoxy resin with an epoxy equivalent of 190 (trade name: Epicoat 828, mfd. by Yuka-Shell Co., Ltd.) and 47.5 g of methyl ethyl ketone was added 23.8 g of diethanolamine, and the resulting mixture was allowed to react with stirring at 70° C. for 5 hours to obtain an oligo-polyol solution (AOP-8) containing tertiary amino groups and no epoxy group. Then 118.8 g of the oligo-polyol solution (AOP-8) was reacted with 111.7 g of the same block isocyanate solution (BL-1) as that prepared in Resin Synthesis Example I to obtain a prepolymer solution (resin VIII) for primary containing a block isocyanate group, tertiary amino group, and hydroxyl group in one and the same molecule.

(4) Preparation of Resin Composition

The resin solutions (I–VIII) were respectively mixed and dispersed with other ingredients in a solid base proportions shown in Table 1, and diluted to a total solid content of 20% by using a solvent mixture of toluene/methyl cellosolve acetate=1/2 (weight ratio) to obtain resin compositions for use in coating.

(5) Test Methods

1. Performance of ED film

A test sheet was subjected to conventional surface treatment steps for automobiles as shown below:

| ① | Degreasing, with FC-L 4460 (a trade name, mfd. by Nippon Parkerizing Co.) 18 g/l; 40–43° C. × 2 minutes, spraying, |
| ② | Water washing, with city water, RT × 20 sec. spraying |
| ③ | Surface conditioning, with PN-ZN (a trade name, mfd. by Nippon Parkerizing Co., spraying), 1 g/l RT × 20 sec., spraying |
| ④ | Chemical conversion treatment, with PB-L3020 (a trade namel, mfd. by Nippon Parkerizing Co.), spraying, M agent: 48 g/l   FA = 1.0 pt  AD 4813:   5 g/l   TA = 20.0 pt  AD 4856:  17 g/l   AC = 2.5 pt  43° C. × 2 minutes, dipping |
| ⑤ | Water rinsing, with city water, RT × 20 sec., spraying |
| ⑥ | Water washing, with diconized water, RT × 20 sec., spraying |
| ⑦ | Drying off, 110° C. × 2 minutes, hot air circulation oven. |

Then, the sheet was subjected to electrodeposit coating by use of cathodic electrodeposit paints for automobiles No. 9450 (A) and HB-2000L (B) (trade names, mfd. by Kansai Paint Co., Ltd.) at a distance between electrodes of 15 cm, applied voltage of 350 V, and liquid temperature of 25° C., the electric current being applied for two minutes, then washed with water (city water, RT×20 sec., spraying), baked in a hot air circulation oven at 175° C. for 30 minutes, and then the appearance of the resulting sheet was judged by visual observation.

Criteria for judgement:
◎: Nothing abnormal
○: 1–4 pinholes per 1.05 dm$^2$
⊚ : 5–15 pinholes per 1.05 dm$^2$
Δ: 66–100 pinholes per 1.05 dm$^2$
X: 100 or more pinholes per 1.05 dm$^2$

2. Corrosion resistance test

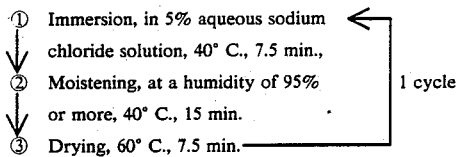

After the above cycle had been repeated 2000 times, the appearance of the sheet was guided by visual observation.

Criteria for judgement:
◎: No red rust development
○: Red rust development: less than 5%
⊚ : Red rust development: not less than 5%, less than 10%
Δ: Red rust development: not less than 10%, less than 20%
X: Red rust development: not less than 20%

3. Adhesion test

After cathodic electrodeposit coating, the sheet was carried with a top coating paint for automobiles in a thickness of 30–40 μm and subjected to adhesion tests.

(1) Primary adhesion test

A checkerboard pattern of 100 squares of 2 mm intervals was cut on the sheet with a cutting knife, and an adhesive tape was pressure-adhered thereonto and then peeled off. The percentage of remaining coating film after the peeling off was examined by visual observation.

(2) Secondary adhesion test

The sheet was immersed in warm water (pure water) at 40° C. for 240 hours and then taken out. Within 30 minutes after the taking out, the sheet was tested in the same manner as in the primary adhesion test.

Criteria for judgement:
◎: Nothing abnormal
○: Peeled-off area: less than 1%
⊚ : Peeled-off area: not less than 1%, less than 2%
Δ: Peeled-off area: not less than 2%, less than 5%
X: Peeled-off area: not less than 5%

TABLE 1

| Resin composition No. | Resin synthesis example No. | Characteristics of resin | | | | Amount of silica added (part) | Amount of rust preventive phosphate pigment added (part) |
|---|---|---|---|---|---|---|---|
| | | Isocyanate | Blocking agent | Polyol | Ionicity | | |
| (1) | I | TDI | Phenol | PPG | Cationic | 8 | None |
| (2) | I | TDI | Phenol | PPG | Cationic | 20 | None |
| (3) | I | TDI | Phenol | PPG | Cationic | 20 | 20 |
| (4) | I | TDI | Phenol | PPG | Cationic | 40 | 20 |
| (5) | I | TDI | Phenol | PPG | Cationic | 80 | None |
| (6) | I | TDI | Phenol | PPG | Cationic | 80 | 20 |
| (7) | I | TDI | Phenol | PPG | Cationic | 250 | None |

TABLE 1-continued

| Resin composition No. | Resin synthesis example No. | Characteristics of resin | | | | Amount of silica added (part) | Amount of rust preventive phosphate pigment added (part) |
|---|---|---|---|---|---|---|---|
| | | Isocyanate | Blocking agent | Polyol | Ionicity | | |
| (8) | II | TDI | Phenol | PPG | Cationic | 40 | None |
| (9) | II | TDI | Phenol | PPG | Cationic | 40 | 20 |
| (10) | III | TDI | Phenol | PPG | Nonionic | 40 | 20 |
| (11) | IV | TDI | Phenol | Acryl | Anionic | 40 | 20 |
| (12) | V | TDI | Cresol | BPX-33 | Cationic | 40 | 20 |
| (13) | VI | IPDI | Phenol | PPG | Cationic | 40 | 20 |
| (14) | VII | MDI | Oxime | BPX-33 | Cationic | 40 | 20 |
| (15) | VIII | TDI | Phenol | Epoxy | Cationic | 40 | 20 |

Note: The amount of silica and rust preventive phosphate pigment added are relative to 100 parts by weight of resin.

The essential points of Examples according to the present invention are shown in Table 2 and those of Comparative Examples in Table 3. The methods used for the evaluation shown in the Tables are as described above.

so that normal deposition of electrodeposit coating film becomes difficult.

Thus, it is usually difficult to satisfy the requirements for both corrosion resistance and electrodeposit coatability at the same time by means of organic coating film.

TABLE 2

| Example No. | Resin Composition No. | Amount of coating film adhered (g/m²) | Coating material drying condition | Cathodic ED property | | Corrosion resistance | Adhesion | |
|---|---|---|---|---|---|---|---|---|
| | | | | A | B | | Primary | Secondary |
| 1 | (2) | 0.9 | 145° C. × 10 sec | ○ | ○ | ◎ | ○ | ○ |
| 2 | (2) | 1.8 | 145° C. × 10 sec | ◎ | ◎ | ○ | ○ | ○ |
| 3 | (3) | 1.0 | 145° C. × 10 sec | ○ | ○ | ○ | ○ | ○ |
| 4 | (3) | 1.9 | 145° C. × 10 sec | ◎ | ◎ | ○ | ○ | ○ |
| 5 | (4) | 0.7 | 145° C. × 10 sec | ○ | ○ | ○ | ○ | ○ |
| 6 | (4) | 2.0 | 145° C. × 10 sec | ○ | ○ | ○ | ○ | ○ |
| 7 | (5) | 1.1 | 145° C. × 10 sec | ○ | ○ | ○ | ○ | ○ |
| 8 | (6) | 1.2 | 145° C. × 10 sec | ○ | ○ | ○ | ○ | ○ |
| 9 | (6) | 2.5 | 145° C. × 10 sec | ○ | ○ | ○ | ○ | ○ |
| 10 | (8) | 1.1 | 145° C. × 10 sec | ○ | ○ | ○ | ○ | ○ |
| 11 | (8) | 2.1 | 145° C. × 10 sec | ○ | ○ | ○ | ○ | ○ |
| 12 | (9) | 1.0 | 145° C. × 10 sec | ○ | ○ | ○ | ○ | ○ |
| 13 | (12) | 1.0 | 145° C. × 10 sec | ○ | ○ | ○ | ○ | ○ |
| 14 | (13) | 1.0 | 165° C. × 10 sec | ○ | ○ | ○ | ○ | ○ |
| 15 | (14) | 1.0 | 145° C. × 10 sec | ○ | ○ | ○ | ○ | ○ |
| 16 | (15) | 1.0 | 145° C. × 10 sec | ○ | ○ | ○ | ○ | ○ |

TABLE 3

| Comparative Example No. | Resin Composition No. | Amount of coating film adhered (g/m²) | Coating material drying condition | Cathodic ED property | | Corrosion resistance | Adhesion | |
|---|---|---|---|---|---|---|---|---|
| | | | | A | B | | Primary | Secondary |
| 1 | (1) | 1.5 | 145° C. × 10 sec | ◎ | ◎ | X | ◎ | △ |
| 2 | (7) | 1.2 | 145° C. × 10 sec | ○ | ○ | ○ | △ | X |
| 3 | (4) | 0.2 | 145° C. × 10 sec | ○ | ○ | X | ○ | X |
| 4 | (6) | 4.5 | 145° C. × 10 sec | △ | △ | ○ | ○ | ○ |
| 5 | (10) | 1.1 | 145° C. × 10 sec | Untestable because of failing to cure | | | | |
| 6 | (11) | 0.9 | 145° C. × 10 sec | Untestable because of failing to cure | | | | |
| 7 | (10) | 1.1 | 220° C. × 10 sec | X | X | ○ | ○ | ○ |
| 8 | (11) | 0.9 | 220° C. × 10 sec | X | X | ○ | ○ | ○ |

Note: The amount of coating film adhered was controlled through the dilution ratio with a mixed solvent (toluene/methyl cellosolve acetate = ½) and the wet-base coating amount adjusted by a bar coater.

SUMMARY OF THE RESULTS OF EXAMPLES AND COMPARATIVE EXAMPLES (1) In general, the amount of adhered organic coating film and the corrosion resistance are roughly proportional to each other, and the corrosion resistance tends to be improved with increase in the amount of adhered coating film.

However, common organic coating films have a high electric resistance. When the adhered amount of coating film is increased the electric resistance is increased, As contrasted thereto, the resin composition according to the present invention makes it possible to satisfy the hitherto conflicting requirements for properties at the same time.

(2) Although when the amount of silica added is less than 10 parts (for example, Comparative Example 1, resin composition No. 1) a satisfactory corrosion resistance cannot be obtained, when the amount is not less than 10 parts and not more than 100 parts (for example, Examples 1-16, resin composition Nos. 2-6, 8-15) the requirements for the cathodic ED property, corrosion resistance, and adhesion can be satisfied at the same time.

When the amount of silica added exceeds 100 parts the cathodic ED property and corrosion resistance are both good, but adhesion is poor (for example, comparative Example 2, resin composition No. 7).

(3) As to comparison based on the amount of coating film, when it is 0.3 g/m² or more, satisfactory corrosion resistance, cathodic ED property and adhesion can be obtained (for example, Example 5, resin composition No. 4), whereas when the amount exceeds 4.0 g/m² (for example, Comparative Example 4, resin composition No. 6) corrosion resistance and adhesion is good, but the cathodic ED property is poor.

When the amount is less than 0.3 g/m² (for example, Comparative Example 3, resin composition No. 4) corrosion resistance and adhesion is poor although the cathodic ED property is good.

(4) As to comparison between Resin Synthesis Examples, when the resin contains no tertiary amino group (for example, Resin Synthesis Examples III, IV), curing conditions of 220° C.×10 seconds or more severe are required and further the cathodic ED property of cured film is unsatisfactory (for example, Comparative Examples 5–8).

Although the effect of the present invention is apparent from the Examples and Comparative Examples, it may be further summarized as follows. Thus, by using zinc-plated steel sheets surface-treated by the process of the present invention, cathodic electrodeposit coated steel sheets having a good surface appearance and excellent corrosion resistance and workability can be obtained and, in consequence, automobile carbodies excellent in both coating appearance and corrosion resistance can be produced.

What is claimed is:

1. A process for preparing a zinc-plated or zinc alloy-plated steel sheet for cathodic electrodeposition coating, said steel sheet having been chromate-treated, which comprises applying a protective coating material to said plated steel sheet and heat drying the resulting coating to form a protective film on said sheet, said protective coating material having as a principal component of a film-forming organic component a block isocyanate-containing prepolymer containing in one and the same molecule respectively at least one blocked isocyanate group, hydroxyl group, and tertiary amino group, and containing 10–100 parts by weight of silica sol relative to 100 parts by weight of said prepolymer, said coating material having been applied to the surface of said sheet in such a thickness that the resulting dry film is present in an amount of 0.3 g–4 g/m² of surface coated.

2. The process according to claim 1, in which the block isocyanate-containing prepolymer is prepared by reacting a tertiary amino group-containing polyol with a polyisocyanate compound having at least one blocked isocyanate group and at least one free isocyanate group.

3. The process according to claim 2, wherein the amino group-containing polyol is a trialkanolamine, an alkylene oxide adduct of a polyalkylene polyamine, or an adduct of an alkylene oxide and an alicyclic or aromatic polyamine.

4. A process according to claim 2, in which the amino group-containing polyol has been reacted with a diisocyanate compound.

5. The process according to claim 2, in which the amino group containing polyol is an adduct of an epoxy resin and a dialkanolamine.

6. The process according to claim 2, in which the polyisocyanate compound is an aromatic diisocyanate.

7. A process according to claim 1, in which the prepolymer includes isocyanate groups reacted with a polyol to form a urethane linkage.

8. The process according to claim 1, in which the isocyanate is blocked with a phenol.

9. A process according to claim 1, in which the molar ratio of hydroxyl groups to blocked isocyanate groups in the prepolymer is in the range of 3/1 to 1/3.

10. A process according to claim 9, in which the ratio is in the range of 2/1 to 1/2.

11. The process according to claim 1, in which the silica sol is present in an amount of 20 to 80 parts by weight relative to 100 parts of the prepolymer.

12. A steel sheet having an electrodeposition coating thereon, said coating having been applied by cathodic electrodeposition of a paint on the protective film of the coated steel sheet according to claim 11.

13. The coated steel sheet having a protective film thereon prepared by the process according to claim 1.

* * * * *